Figure 1:
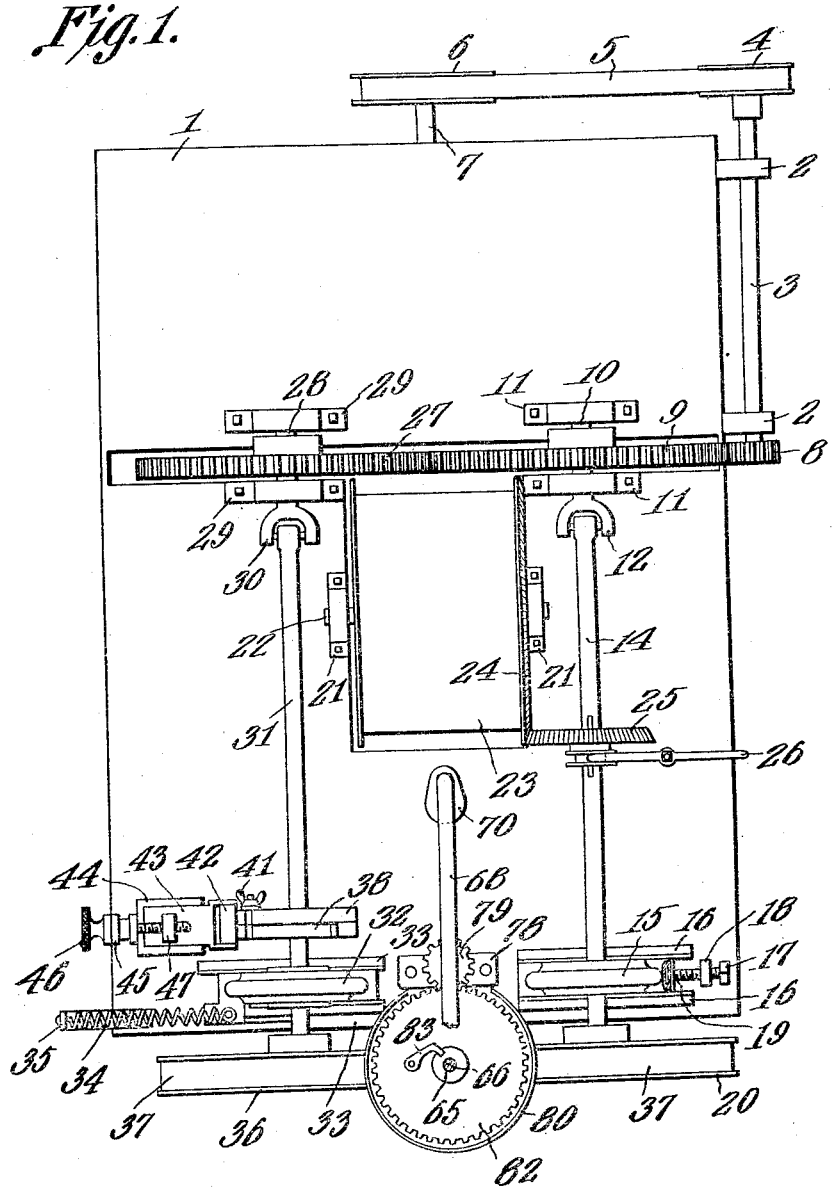

J. MORROW.
ROCK DRILL.
APPLICATION FILED NOV. 18, 1913.

1,113,467.

Patented Oct. 13, 1914.
2 SHEETS—SHEET 1.

Jeremiah Morrow,
Inventor

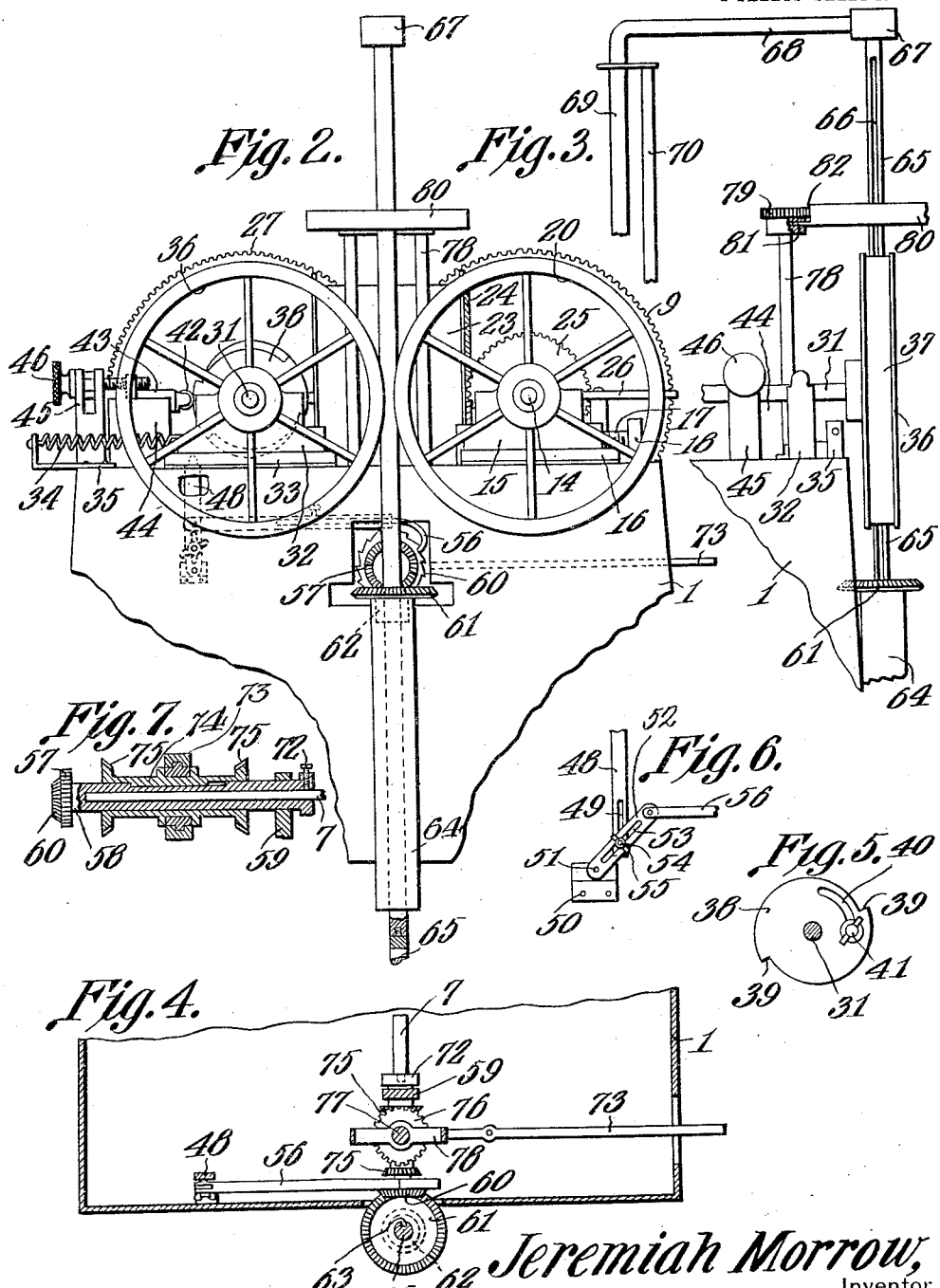

UNITED STATES PATENT OFFICE.

JEREMIAH MORROW, OF WELLSTON, OHIO.

ROCK-DRILL.

1,113,467. Specification of Letters Patent. Patented Oct. 13, 1914.

Application filed November 18, 1913. Serial No. 801,662.

*To all whom it may concern:*

Be it known that I, JEREMIAH MORROW, a citizen of the United States, residing at Wellston, in the county of Jackson and State of Ohio, have invented a new and useful Rock-Drill, of which the following is a specification.

The device forming the subject matter of this application is a structure which combines a rotary drill with a churn drill, the construction being such that a drill hole may be put down with the churn drill to a predetermined depth, whereafter, the hole may be put down by a rotary movement of the drill, both operations being carried out by a single machine.

Another object of the invention is to provide novel means for effecting a quick release of a reciprocating drill, so that the drill will drop promptly, and with a minimum amount of lost motion, when released.

Another object of the invention is to provide novel means for imparting a step-by-step rotation to a reciprocating drill.

The invention aims further to provide novel mechanism for imparting a reciprocation to the drill, the construction being such that the drill may be reciprocated at a high rate of speed.

Another object of the invention is to provide novel mechanism for regulating the stroke of the drill as the drill reciprocates.

The invention contemplates novel means whereby, at the will of the operator, a pair of eccentrics which serve to impart a reciprocating movement to the drill may be set as a continuous wheel, thereby permitting a string of tools to be raised out of the well.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows the invention in top plan; Fig. 2 is an end elevation; Fig. 3 is a fragmental side elevation; Fig. 4 is a fragmental horizontal section; Fig. 5 is a plan of one eccentric; Fig. 6 is an elevation showing a portion of the step-by-step mechanism whereby the drill is intermittently rotated; Fig. 7 is a longitudinal sectional detail illustrating a portion of the means whereby one section of the drill rod may be separated, by rotation, from another section thereof.

In carrying out the invention there is provided a supporting structure 1 which may be of any desired form. Projecting from the supporting structure 1 are bearings 2 in which is journaled for rotation a drive shaft 3. This drive shaft 3 may be actuated in any suitable manner, but the same in the present instance is shown as provided at one end with a pulley 4 about which is trained a belt 5, the same engaging a pulley 6 on a shaft 7 which may be taken to represent the shaft of an engine, a motor or a prime mover of any desired sort. Secured to the forward end of the shaft 3 is a pinion 8 meshing into a gear wheel 9 mounted upon a stub shaft 10 journaled in bearings 11 on the support 1. By means of a universal joint 12 the stub shaft 10 is connected with a shaft 14 journaled at its forward end in a bearing 15 mounted to reciprocate in guides 16 carried by the supporting structure 1. In the ordinary operation of the machine, however, the bearing 15 does not reciprocate, but is held fixed by any suitable means, such as an adjusting screw 17 threaded into a lug 18 on the supporting structure 1, the inner end of the adjusting screw 17 being fixed for rotation but against longitudinal movement in the bearing 15, as indicated at 19. The shaft 14 is provided with rotary means for engaging one side of a drill to be described hereinafter, and this rotary means preferably takes the form of a wheel 20 fixed to the forward end of the shaft 14.

As an incidental feature of the structure, and having no connection with the operation of the device, generally considered, bearings 21 are mounted upon the supporting structure 1 to one side of the shaft 14, the bearings 21 receiving a transverse shaft 22 carrying a drum 23 provided adjacent its periphery with a beveled gear 24 engageable by a beveled pinion 25 splined upon the shaft 14 for rotation therewith, the beveled pinion 25 being under the control of a clutch lever 26. By manipulating the clutch lever 26, the pinion 25 may be thrown into and out of engagement with the beveled gear 24, and thus the drum 23 may be rotated, for any purpose in connection with the use of the machine. The drum 23 and its driving mechanism will not be alluded to hereinafter, and need not be further considered.

The gear wheel 9 which is fixed to the stub shaft 10 meshes into a gear wheel 27 fixed to a stub shaft 28 journaled in bearings 29 on the supporting structure 1, the stub shaft 28 being connected by means of a universal joint 30 with a shaft 31, corresponding to the shaft 14, the shaft 31 being journaled in a bearing 32 mounted to slide in guides 33 on the supporting structure 1. A retractile spring 34 is connected to the bearing 32 and is secured to a bracket 35 projecting from one side of the supporting structure 1. The forward end of the shaft 31 is equipped with a wheel 36, corresponding to the wheel 20, the wheels 36 and 20 being provided with yieldable peripheral facings 37.

Mounted on the shaft 31 is a pair of cams 38 having shoulders 39. One of the cams 38 is fixed to the shaft 31, the other cam being adjustable, circumferentially, upon the shaft. The cams 38 are connected by any suitable means for preventing relative rotation between them, and with this end in view, one cam is provided with a slot 40 receiving a screw and wing nut 41 on the other cam. The cams are adapted to cooperate with an abutment, the same comprising a roller 42 journaled on a yoke 43 mounted to slide in a guide 44 for adjustment. In order to hold the yoke 43 in adjusted positions, a screw 46 is held against longitudinal movement but for rotation in a post 45 on the supporting structure 1, the screw 46 being threaded into a lug 47 on the yoke 43.

Projecting downwardly from the bearing 32 in which the shaft 31 is journaled is an arm 48 having a slot 49. Fixed to the supporting structure 1 is a bracket 50 upon which is pivoted, as indicated at 51, a link 52 having a slot 53. A pivot element 54 is held by a wing nut 55 or any other suitable means in the slot 53 of the link 52 and one end of the pivot element 54 travels in the slot 49 of the arm 48. Pivoted to the link 52 is a pawl 56 adapted to engage a ratchet wheel 57 constituting a part of the shaft 58 journaled in a bearing 59. Attached to the outer end of the shaft 58 is a beveled pinion 60 meshing into a beveled pinion 61 formed at the upper end of a sleeve 62, the sleeve being provided with a key or feather 63, and being journaled for rotation in a bearing 64 mounted on one end of the supporting structure 1.

Mounted to reciprocate in the sleeve 62 is a drill rod 65, provided with a keyway 66 which engages the key 63. The upper end of the drill rod 65 is journaled for rotation in a head 67, but is held against longitudinal movement therein, the head 67 constituting a part of an arm 68 having an extension 69 slidably received in a guide 70 constituting a part of the supporting structure 1.

Threaded into the shaft 58 is a set screw 72 engaging one end of the motor or engine shaft 7, the same extending into the shaft 58. A lever 73 is fulcrumed upon the supporting structure 1, the lever 73 being operatively connected with a sleeve 74 splined onto the shaft 58, the sleeve 74 being equipped at its ends with beveled pinions 75. The beveled pinions 75 on the sleeve 74 are adapted to engage, one at a time, with a beveled pinion 76 secured to the lower end of an upright shaft 77 journaled for rotation in a frame 78 carried by the supporting structure 1, the shaft 77 being equipped at its upper end with a pinion 79 which rests on top of the frame 78.

The invention further includes an annular casing 80 which may be placed about and removed from the drill rod 65, the casing 80 having fingers 81 received in the upper portion of the frame 78. Located within the casing 80 is a gear wheel 82, adapted to mesh into the pinion 79, the gear wheel 82 having a pawl 83 which may be engaged in the keyway 66 of the drill rod 65.

Let it be supposed that the structure is to be employed as a churn drill. Under such circumstances, the casing 80 and the gear wheel 82 are removed from the drill rod 65, the set screw 72 is loosened so that the shaft 58 may rotate independently of the shaft 7, and the sleeve 74 is shifted to an intermediate position by means of the lever 73 or its equivalent, so that the sleeve 74 is not coupled up by means of either of the pinions 75 with the pinion 76 and the shaft 78.

When the shaft 3 is rotated in any suitable manner, for instance by the shaft 7, the pulleys 6 and 4 and the belt 5, the pinion 8 will drive the pinion 9 and impart rotary movement to the shaft 14 through the stub shaft 10, the facing 37 on the wheel 20 being held in engagement with one side of the drill rod 65. From the gear wheel 9 motion will be transmitted to the gear wheel 27 and from the gear wheel 27 to the shaft 31 through the medium of the stub shaft 28. The cams 38 may be so set that when the shaft 31 is rotated, the cams, engaging the roller 40, will, throughout a portion of the rotation of the shaft 31, move the forward end of the shaft 31 to the right in Fig. 1 and hold the facing 37 on the wheel 36 engaged with one side of the drill rod 65. It will now be understood that when the wheels 20 and 36 are rotated, the same, bearing against opposite sides of the drill rod 65 and rotating in opposite directions, will effect a raising of the drill rod. So soon, however, as the shoulder 39 on one of the cams 38 rides off the roller 42, the spring 34 will react upon the bearing 32 and swing the shaft 31 laterally, the wheel 36 being drawn away from the drill rod 65. Then, the drill rod will drop under its own weight. Especial attention is directed to the fact that by the construction above described, there is a minimum amount of lost motion in gripping and releasing the drill rod 65. Further, the release afforded is immediate and positive, and there is no dragging action on the drill rod due to the action of the wheel 36. At this stage, two other points are to be noted. First, by adjusting the cams 38 circumferentially with respect to each other, and by holding them in their adjusted positions by means of the screw and wing nut 41, the space between the shoulders 39 of the respective cams may be adjusted, thus varying the amount of drop in the drill rod 65. Secondly, the cams 38 may be so set and held with respect to each other that they will form a continuous, circular wheel. When this operation is brought about, the cams in the form of a wheel will remain in abutment with the roller 42, and thus the wheel 36 will be held continuously engaged with the drill rod 65. Therefore, the drill rod 65 may be elevated to any desired extent and a string of drill tools may be lifted out of a boring. Passing now to the mechanism whereby an intermittent rotary movement is imparted to the drill rod 65 it will be understood that when the bearing 32 is moved in the manner above described by the coaction between the cam 38 and the roller 42, the depending arm 48 which constitutes a part of the bearings will be reciprocated transversely of the machine. The pivot element 54 which is adjustably fixed in the link 52 will travel up and down in the slot 49 of the arm 48 and thus the pawl 56 will be actuated, the pawl engaging the ratchet wheel 57, thus imparting rotation to the shaft 58, the beveled pinion 60 of which, meshing into the beveled pinion 61 will rotate the sleeve 62, an intermittent rotary movement being imparted to the drill rod 65 through the engagement between the key 63 on the sleeve and the keyway 66 in the drill rod. Thus, a reciprocating movement will be imparted to the drill rod 65 and, at the same time, the drill rod will be given a step-by-step rotary movement. The throw of the pawl 56 may be regulated by shifting the pivot element 54 in the slot 53 of the link 52. Let it be supposed that, having proceeded to a predetermined depth by imparting a reciprocating movement to the drill rod 65, it is desired to bore farther, by imparting a rotary movement to the drill rod. Under such circumstances, by manipulating the screw 17 or its equivalent, the shaft 14 may be swung laterally, thus disengaging the wheel 20 from the drill rod 65. By giving a partial rotation to the shaft 31, the cams 38 may be so positioned with respect to the roller 42 that, under the action of the spring 34, the shaft 31 and the wheel 36 will be swung laterally away from the drill rod 65. The drill rod, therefore, is free to rotate. The shaft 58 is then coupled up with the engine shaft 7 by means of the set screw 72 and when the shaft 7 is rotated, continuous rotary movement will be imparted to the shaft 58, rotary movement being imparted to the sleeve 62 and the drill rod 65 through the medium of the intermeshing pinions 60 and 61. During this operation, the ratchet wheel 57 will click over the pawl 56 or, if desired, the pawl 56 may be swung backwardly out of engagement with the ratchet wheel.

The drill rod 65, as is well known is commonly fashioned in a plurality of sections which are threaded together at their meeting ends and at times it is desirable to separate one section of the drill rod from another section thereof. With this end in view, the shafts 31 and 14 are so manipulated that the wheels 20 and 36 will grip and hold against rotation, a lower section of the drill rod. Then, the casing 80 is mounted upon an upper section of the drill rod, the pawl 83 being engaged in the keyway 66 in the upper section of the drill rod and the gear wheel 82 which is carried by the casing being engaged with the pinion 79 on the upper end of the shaft 78. The pawl 56 may be disengaged from the ratchet wheel 57 and through the medium of the lever 73 the sleeve 74 may be shifted longitudinally on the shaft 58 to couple up either of the beveled pinions 75 with the beveled pinion 76 on the lower end of the shaft 77, it thus being possible to rotate the upper section of the drill rod 65 in one direction or the other, through the medium of the shaft 7 and the set screws 72, for the purpose of screwing together or uncoupling, a pair of sections of the drill rod. The pinion 61, the sleeve 62 and the bearing 64 may serve as a sufficient support, opposed to the wheel 36, and therefore, the wheel 20 may be dispensed with.

Having thus described the invention, what is claimed is:—

1. In a device of the class described, a reciprocating drill; and circular elements engaging opposite sides of the drill, one circular element being power driven and one circular element being retractable from the drill; and means for retracting the retractable element from the drill.

2. In a device of the class described, a reciprocating drill; a laterally movable shaft having rotary means for engaging one side of the drill thereby to move the drill in the direction of its length; and mechanism for actuating the shaft laterally to move said means away from the drill.

3. In a device of the class described, a reciprocating drill; a laterally movable shaft having rotary means for engaging one side of the drill thereby to move the drill in the direction of its length; a cam on the shaft; and an abutment with which the cam coöperates.

4. In a device of the class described, a reciprocating drill; a laterally movable shaft having rotary means for engaging one side of the drill thereby to move the drill in the direction of its length; yieldable means for moving the shaft laterally; a cam on the shaft; and an abutment with which the cam engages.

5. In a device of the class described, a reciprocating drill; a laterally movable shaft having rotary means for engaging one side of the drill thereby to move the drill in the direction of its length; a cam on the shaft; a movable abutment with which the cam engages; and means for holding the abutment in adjusted positions.

6. In a device of the class described, a reciprocating drill; a laterally movable shaft having rotary means for engaging one side of the drill thereby to move the drill in the direction of its length; a cam on the shaft; a movable abutment; means for holding the abutment in adjusted positions; and a yieldable means for moving the shaft laterally.

7. In a device of the class described, a reciprocating drill; a laterally movable shaft having rotary means for engaging one side of the drill, thereby to move the drill in the direction of its length; a pair of cams on the shaft; and an abutment with which the cams engage; the cams being circumferentially adjustable with respect to each other to vary the drop of the drill.

8. In a device of the class described, a reciprocating drill; a laterally movable shaft having rotary means for engaging one side of the drill thereby to move the drill in the direction of its length; cams circumferentially adjustable upon the shaft, the peripheries of the cams coöperating to form a circle when the cams are adjusted circumferentially: an abutment with which the cams engage; and means for holding the cams against relative circumferential movement and with the peripheries of the cams coöperating to form a circle.

9. In a device of the class described, a supporting structure; a ratchet wheel carried thereby; a drill mounted to reciprocate upon the supporting structure; means for operatively connecting the ratchet wheel with the drill; a bearing slidable upon the supporting structure; a pawl operatively connected with the bearing and engaging the ratchet wheel; a shaft journaled in the bearing and provided with rotary means for engaging one side of the drill thereby to raise the drill; a cam upon the shaft; and an abutment engaging the cam.

10. In a device of the class described, a supporting structure; a drill mounted to reciprocate therein; a bearing slidable upon the supporting structure; a laterally movable shaft journaled in the bearing and having rotary means for engaging one side of the drill thereby to raise the drill; means for moving the bearing to retract the rotary means from the drill; a pawl operatively connected with the bearing; a second shaft mounted for rotation on the supporting structure; a ratchet wheel on the second shaft and engageable by the pawl; means for operatively connecting the second shaft with the drill; and means for independently rotating the second shaft.

11. In a device of the class described, a supporting structure; a drill mounted to reciprocate therein and comprising sections; a pair of rotary elements engaging opposite sides of the drill, one rotary element being power driven and one rotary element being laterally movable; means for holding the rotary elements engaged with one section of the drill when the power driven rotary element is at rest; rotary means engaging another section of the drill; and mechanism upon the supporting structure for operating said rotary means to effect a separation of the sections of the drill.

12. In a device of the class described, a supporting structure; a drill mounted therein and comprising sections, the drill having a keyway; a casing removably mounted upon one section of the drill; means for holding another section of the drill against rotation; a gear wheel journaled in the casing and having a pawl engaging the keyway; means for supporting the casing; a shaft having a pinion meshing into the gear wheel; and means for driving the shaft.

13. In a device of the class described, a supporting structure; a pair of shafts journaled thereon, one shaft being laterally movable; intermeshing pinions on the shafts; means for driving one shaft; a bearing slidable on the supporting structure, in which the laterally movable shaft is journaled; a cam on the laterally movable shaft; an abutment movable upon the supporting structure and coöperating with the cam; means for holding the abutment in adjusted positions; a spring connecting the bearing with the supporting structure and constituting means for securing a coöperation between the cam and the abutment; a drill mounted to reciprocate on the supporting structure and to rotate thereon; wheels on the shafts and engaging opposite sides of the drill; a ratchet wheel mounted for rotation on the supporting structure; a pawl operatively connected with the bearing and coöperating with the ratchet wheel; and means for connecting the ratchet wheel operatively with the drill.

In testimony that I claim the foregoing as my own, I have hereto affixed my signature in the presence of two witnesses.

JEREMIAH MORROW.

Witnesses:
C. E. LITTLE,
V. G. MELVIN.

Copies of this patent may be obtained for five cents each, by addressing the "Commissioner of Patents, Washington, D. C."